(No Model.) 2 Sheets—Sheet 1.
W. GROTHE.
PEDAL FOR BICYCLES OR VELOCIPEDES.
No. 563,959. Patented July 14, 1896.
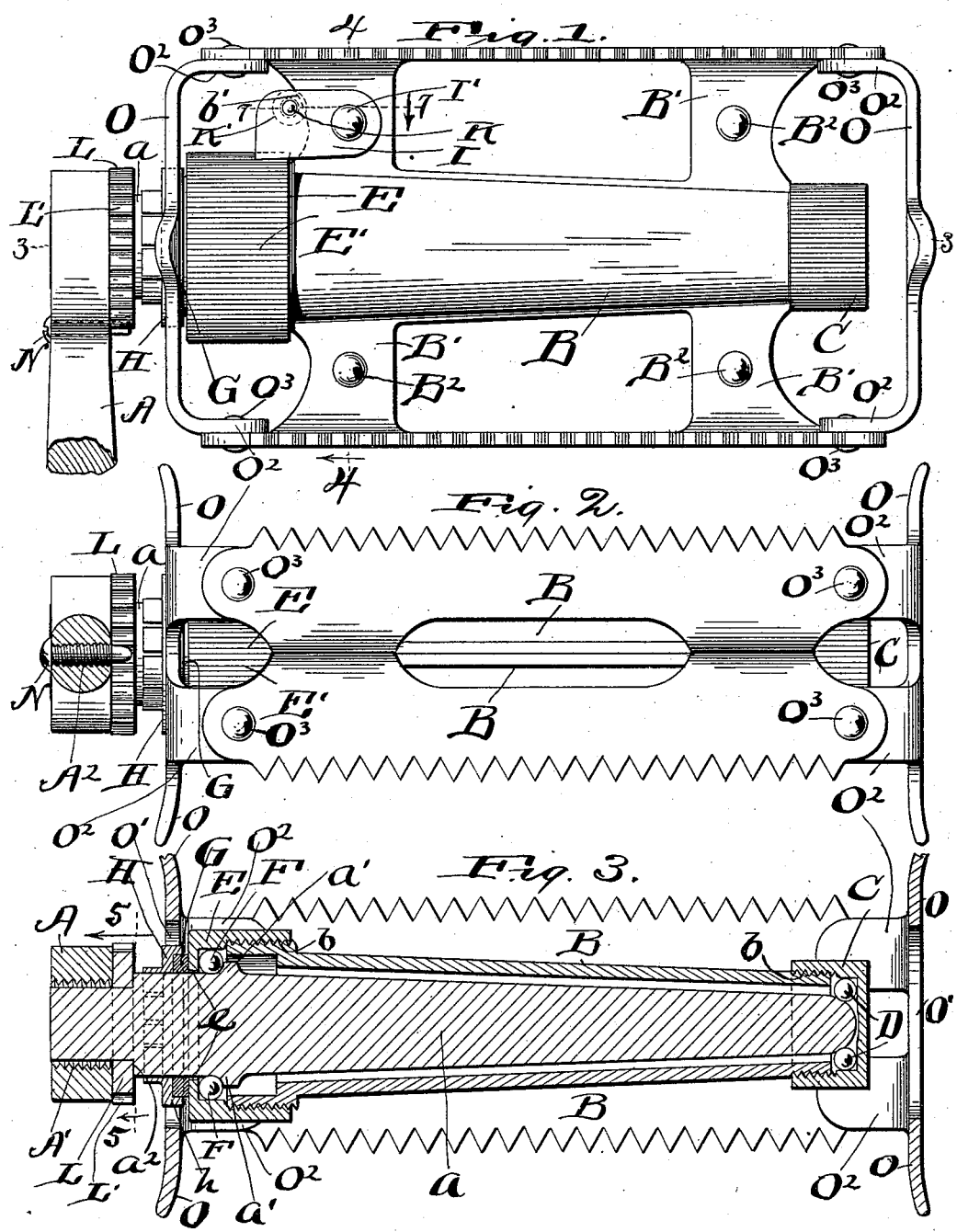
Witnesses.
E. B. Gilchrist
Inventor.
William Grothe
By M. D. Leggett & Co.
his attorneys.

(No Model.) 2 Sheets—Sheet 2.

W. GROTHE.
PEDAL FOR BICYCLES OR VELOCIPEDES.

No. 563,959. Patented July 14, 1896.

Witnesses.
E. B. Gilchrist
[signature]

Inventor.
William Grothe.
By M. D. Leggett & Co.
his attorneys.

THE NORRIS PETERS CO., PHOTO-LITHO., WASHINGTON, D. C.

UNITED STATES PATENT OFFICE.

WILLIAM GROTHE, OF CLEVELAND, OHIO.

PEDAL FOR BICYCLES OR VELOCIPEDES.

SPECIFICATION forming part of Letters Patent No. 563,959, dated July 14, 1896.

Application filed June 7, 1895. Serial No. 551,939. (No model.)

*To all whom it may concern:*

Be it known that I, WILLIAM GROTHE, of Cleveland, in the county of Cuyahoga and State of Ohio, have invented certain new and useful Improvements in Pedals for Bicycles or Velocipedes; and I do hereby declare the following to be a full, clear, and exact description of the invention, such as will enable others skilled in the art to which it pertains to make and use the same.

My invention relates to improvements in the construction of pedals and pedal-supporting shaft for bicycles or velocipedes; and it consists in certain features of construction and combinations of parts, hereinafter described, and pointed out in the claims.

Figure 4:
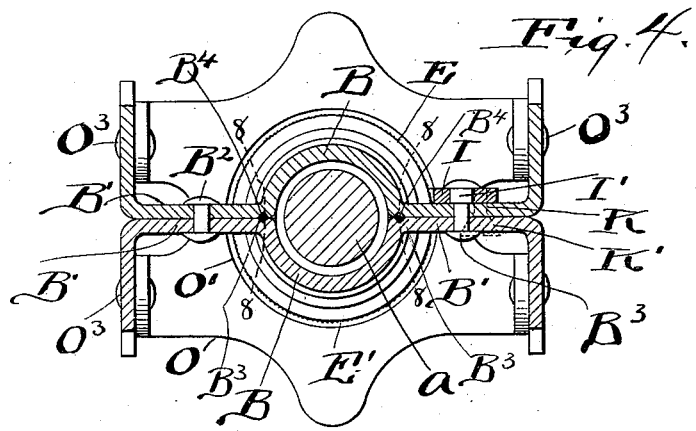
Figure 5:
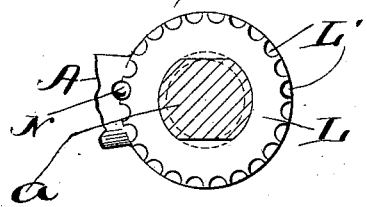
Figure 6:
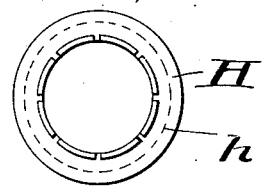
Figure 7:
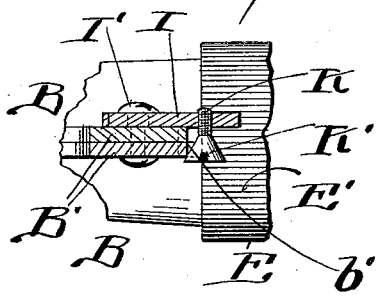
Figure 8:
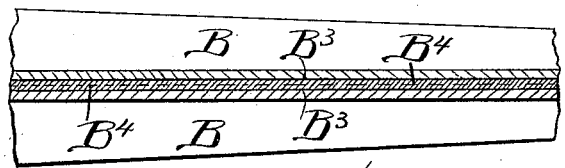

In the accompanying drawings, Figure 1 is a plan of my improved pedal mounted upon the pin of the crank of the pedal-shaft. Fig. 2 is a side elevation of the same, partly in section. Fig. 3 is a central longitudinal section on line 3 3, Fig. 1. Fig. 4 is a transverse section on line 4 4, Fig. 1. Fig. 5 is a section on line 5 5, Fig. 3. Fig. 6 is an end elevation of a split spring-collar preferably employed. Fig. 7 is a section on line 7 7, Fig. 1. Fig. 8 is a longitudinal section on lines 8 8, Fig. 4, showing the preferred manner of forming a dust-proof joint between the two sections or halves of the hub of the pedal.

Referring to the drawings, A designates a crank of the pedal-shaft, and $a$ the crank-pin upon which the pedal is mounted. The hub of the pedal is composed of two sections B B, corresponding in size and shape. Each of said hub-sections is stamped from a sheet-metal blank into the shape required to form one-half of the hub, and said hub-sections, at their meeting ends and at opposite sides, are provided with laterally and outwardly-projecting flanges B'.

I would here remark that the half-sections of the hub are furthermore so shaped that the hub formed by said sections shall taper toward its outer end to conform to the taper of the crank-pin, as shown in Figs. 1 and 3. Having assembled the half-sections and riveted or otherwise secured their flanges B' together, as at B², each end of the hub is externally screw-threaded, as at $b$. The employment of the method of hub construction hereinbefore described results in the production of a hub that is light, strong, and durable, and that is comparatively inexpensive.

I would remark that if the sections of the hub are properly and securely assembled, dust and grit are not likely to find free ingress at the joints of the sections, but in order to effectually exclude grit and dust from entering between the meeting ends of the half-sections I provide said ends with oppositely-arranged grooves or recesses B³, that are occupied by wire or other substance or material B⁴. (See Figs. 4 and 8.)

The outer end of the hub of the pedal (see Figs. 1 and 3) is embraced by a cap C, that is screw-threaded internally and engages the corresponding threads formed upon said end of the hub. Cap C precludes the ingress of dust and grit at the outer end of the pedal-hub, and also retains in place antifriction-balls D, that, in the application of the pedal, are confined between the outer end of the crank-pin and the aforesaid cap and afford bearing for the outer end of the pedal.

The inner and larger end of the pedal-hub is embraced by an internally-screw-threaded cap E, whose threaded portion engages the corresponding threads formed upon said end of the pedal-hub. Cap E is, of course, perforated centrally, as at $e$, to accommodate the location of the crank-pin in the application of said cap, and said cap is not only instrumental in excluding dust and grit from the engaging end of hub, but also serves to retain in place anti-friction-balls F, confined between said cap and an annular shoulder $a'$, formed externally upon the crank-pin, which antifriction-balls afford bearing for the inner end of the pedal. To more effectually exclude the ingress of dust and grit from the inner or larger end of the hub, I mount a washer G upon the crank-pin at the end of cap E.

By the construction hereinbefore described it will be observed that caps C and E perform three functions, viz., first, they are instrumental in holding or affording bearing for the antifriction-balls; secondly, they exclude dust from the bearings, and, thirdly, they are also instrumental in holding or securing together the hub-sections, and consequently the side members of the pedal-frame, and, in fact, said caps or collars would be sufficient in securing together the hub-sections, and consequently the side members, without necessitating the employment of rivets $B^2$.

Washer G is composed, preferably, of felt or other elastic material. Washer G is adapted to frictionally engage cap E, and the friction had between said washer and the cap is controlled by a metallic split spring-collar H, mounted upon the crank-pin between washer G and the crank. Said collar upon the washer-engaging end is preferably provided with an annular flange $h$, that embraces the washer and presses the latter somewhat against the crank-pin.

By the construction just described it will be observed that the friction had between washer G and cap E is increased or diminished according as the washer, by means of the spring-collar, is crowded against or loosened relative to the cap.

Means for locking cap E in the desired adjustment is provided, and consists, preferably, of a latch I, that is pivoted at or near one end, as at I', to a flange B' of the hub of the pedal, and at its opposite end is adapted to engage corrugations E', formed in and arranged transversely of the peripheral surface of cap E. Latch I is operatively connected with a screw K, that has a beveled undercut head K', whose beveled annular side engages an incline $b'$, formed upon the aforesaid flange of the hub, the trend of which incline is in the direction of the outer end of said flange and toward the inner end of the pedal, (see Figs. 1 and 7,) by which construction it will be observed that latch I is rendered operative and locks cap E, or is rendered inoperative, according as the screw is turned the distance required in the one direction or the other. The means I have shown for locking cap E in the desired adjustment is, it will be observed, exceedingly simple in construction, and consequently inexpensive, and I would here remark that latch I is preferably pivoted to the respective flange B' of the hub by (see Fig. 4) one of the rivets employed in securing together the two sections of the hub.

The crank-pin at its inner end is reduced in size circumferentially to form an annular shoulder $a^2$ a suitable distance from the inner extremity of said pin. A collar L is operatively mounted upon the reduced portion of the crank-pin against the aforesaid shoulder. The operative connection between collar L and the crank-pin may be formed in any well-known manner, such, for instance, as shown in Fig. 5, wherein that portion of the crank-pin that bears collar L is not circular in cross-section, and the hole through the collar is correspondingly shaped, so that when the parts are assembled the collar cannot turn independently of the crank-pin. The crank-pin is preferably screwed into the crank, as shown in Fig. 3, the reduced end of the crank-pin being screw-threaded externally to engage the correspondingly-threaded hole A' in the crank.

Means for locking collar L, and consequently the crank-pin, to the crank in such a manner that the crank-pin cannot unscrew from the crank is provided, and consists, preferably, of a screw N that extends through a correspondingly-threaded hole $A^2$ in the crank (see Fig. 3) and is adapted to engage corrugations or notches L', formed in and transversely of the periphery of collar L, by which construction it will be observed that when said screw is turned to bring the free end of its shank into engagement with one of the notches or recesses in collar L, the crank-pin positively cannot work loose from the supporting-crank.

The frame of the pedal is constructed, preferably, as follows: The side members of said frame are preferably made integral with the hub, and to this end the blank that is used to form one-half of the hub is made large enough and stamped into the shape required to form one-half of both side members of the pedal-frame, as shown in Fig. 4.

O designates the end members of the pedal-frame. Each of said end members is composed, preferably, of a single piece that, at opposite ends, is riveted to the different side members, respectively, of the pedal-frame. Members O are, of course, perforated centrally, as at O', to accommodate the removal or assemblage of parts of the pedal.

Each end member O, at each end terminates in two laterally and inwardly projecting ears $O^2$, riveted at $O^3$ to the two different ears respectively formed upon the engaging end of and arranged in line with the adjacent side member of the pedal-frame, as shown in Figs. 1, 2, and 3. By this construction it is obvious that a strain on any one of the four ears of a side piece of the pedal-frame is communicated to all of said ears, and hence my improved pedal-frame possesses great strength and durability.

What I claim is—

1. The combination with the pin of the crank of the pedal-shaft, of the pedal having its hub embracing said pin, said hub being made in halves longitudinally and screw-threaded externally at each end, correspondingly internally-threaded caps engaging the ends of the hub and securing the hub-sections together, antifriction-balls interposed between the crank-pin and internal surfaces of the caps, and said caps being suitably shaped to afford bearing for the balls, and to exclude dust and dirt from the ball-bearings, substantially as set forth.

2. The combination with the pin of the crank of the pedal-shaft, of the pedal having its hub embracing said pin, said hub being screw-threaded at each end, correspondingly-threaded caps engaging the ends of the hub, and antifriction-balls interposed between the internal surface of said caps and the crank-pin, a latch for engaging and locking the cap at the inner end of the hub in the desired adjustment, a screw operatively connected with said latch, said screw having an undercut beveled head and an edge of the pedal-frame engaging the beveled annular surface of said head and having such trend that the latch shall be actuated toward or from the adjacent cap according as the screw is turned in the one direction or the other, substantially as set forth.

3. The combination with the pin of the crank of the pedal-shaft, of the pedal having its hub embracing said pin, said hub being screw-threaded at each end, correspondingly-threaded caps engaging the threaded ends of the hub, and antifriction-balls interposed between the internal surface of said caps and the crank-pin, a washer mounted upon the crank-pin at the outer surface of the cap that engages the inner end of the hub, and a split spring-collar mounted upon the crank-pin and arranged to render it capable of controlling the friction had between the aforesaid washer and cap, substantially as set forth.

In testimony whereof I sign this specification, in the presence of two witnesses, this 27th day of April, 1895.

WILLIAM GROTHE.

Witnesses:
C. H. DORER,
L. WARD HOOVER.